Aug. 30, 1932. A. E. DRISSNER 1,874,470
PROFILING ATTACHMENT
Filed Aug. 31, 1929 2 Sheets-Sheet 1
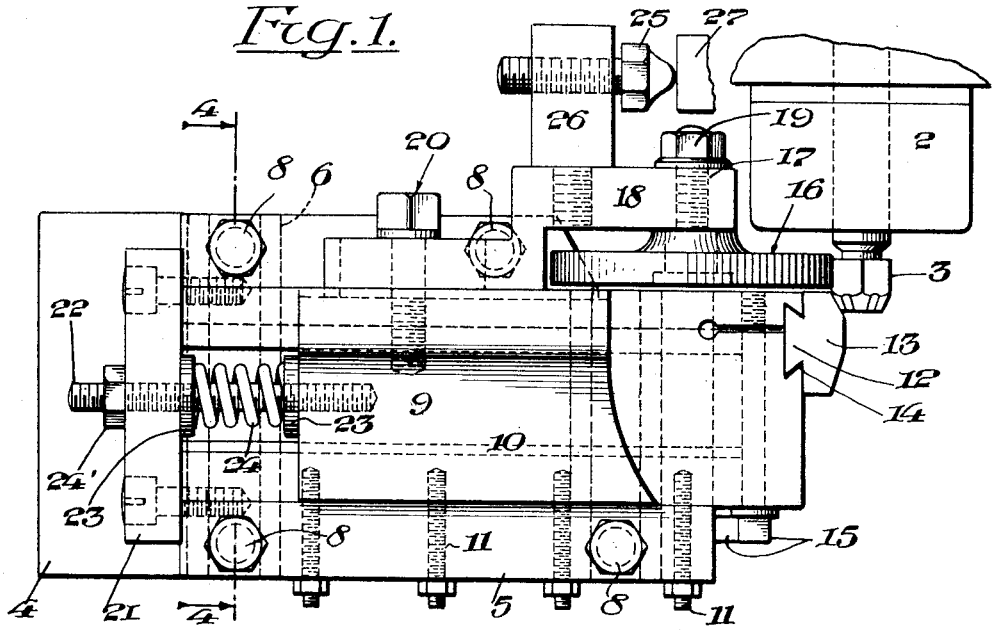
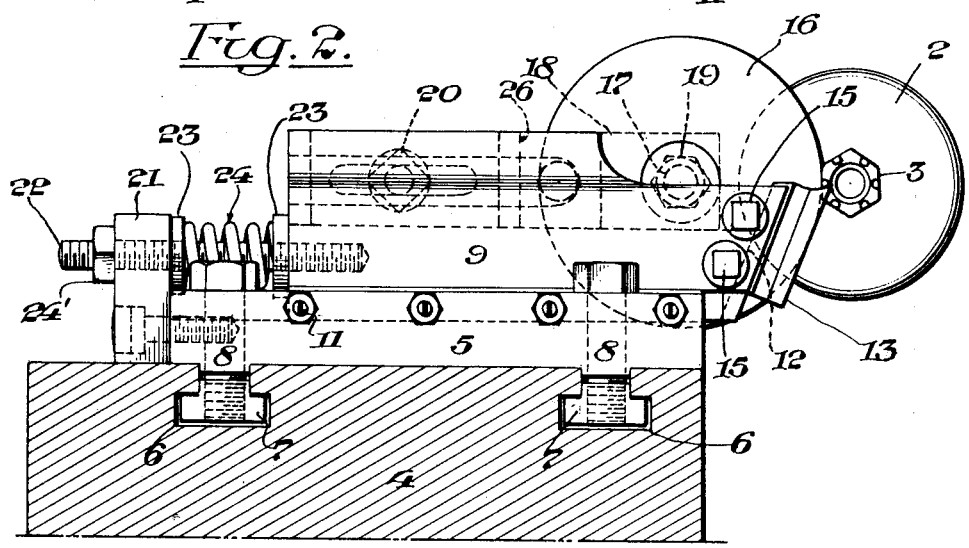
Inventor
Alfred E. Drissner
by his Attorney Aug. 30, 1932.  A. E. DRISSNER  1,874,470
PROFILING ATTACHMENT
Filed Aug. 31, 1929   2 Sheets-Sheet 2
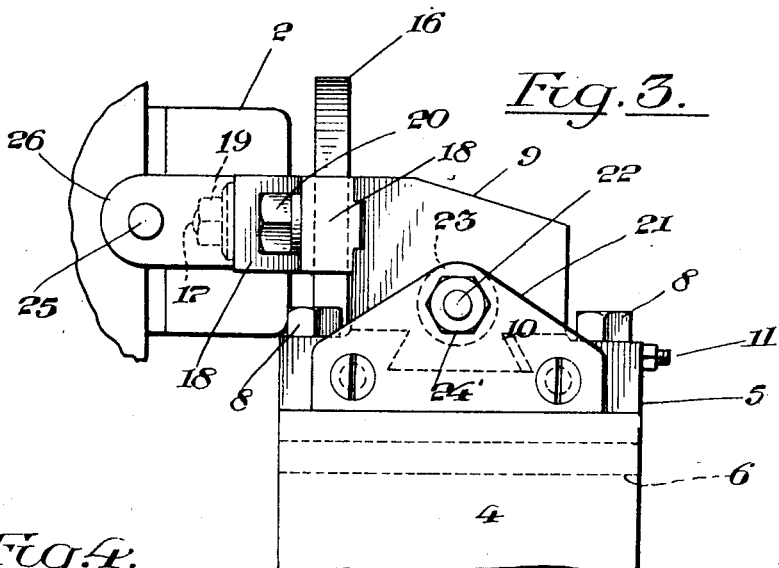
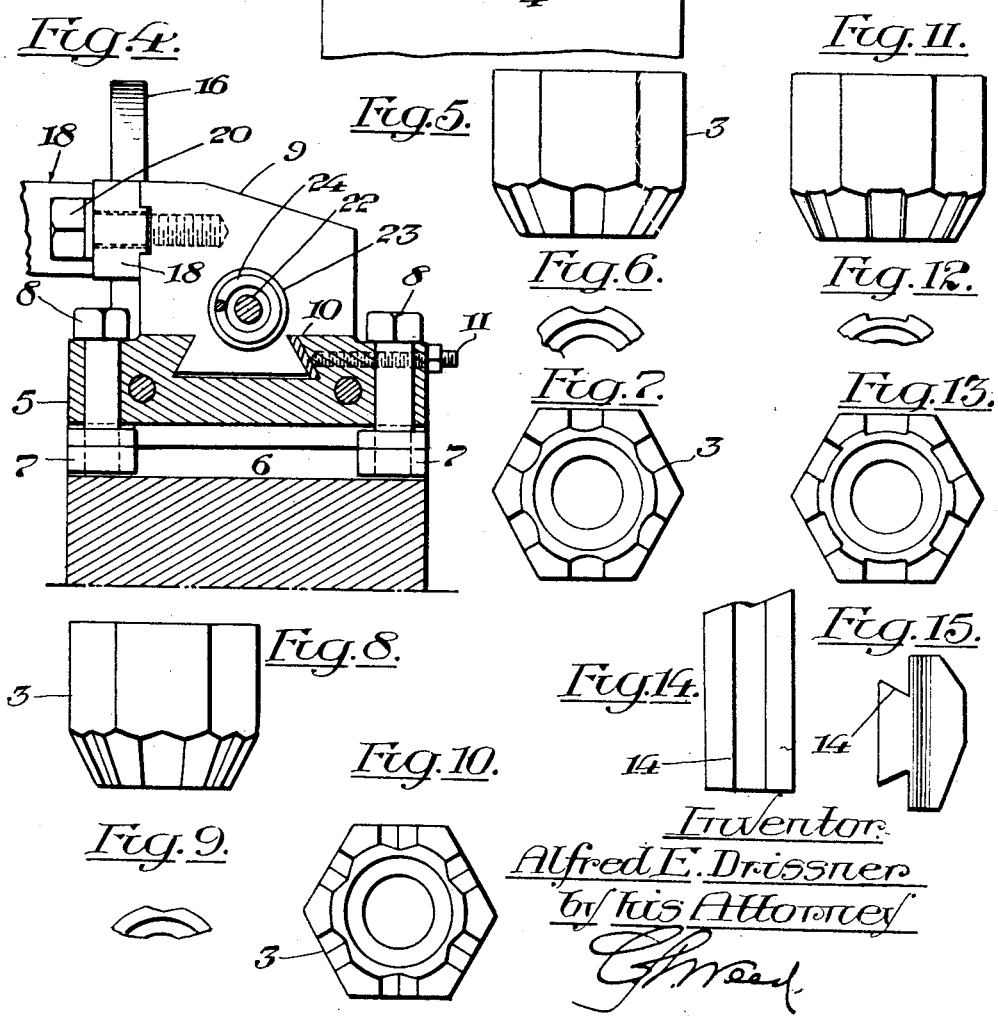

Patented Aug. 30, 1932

1,874,470

UNITED STATES PATENT OFFICE

ALFRED E. DRISSNER, OF CLEVELAND, OHIO, ASSIGNOR TO THE NATIONAL ACME COMPANY, OF CLEVELAND, OHIO, A CORPORATION OF OHIO

PROFILING ATTACHMENT

Application filed August 31, 1929. Serial No. 389,715.

This invention is for a profiling machine or attachment adapted to operate on the side faces of a piece of work or nut, the object of the invention being to provide a profiling attachment effective to relieve or form a groove on the side faces of the work or nut and particularly on the tapered faces thereof, and which attachment can be readily applied to the forming slide of an automatic screw machine, although it can be used in connection with hand or automatic lathes or similar type of machines.

A further object of the invention is the provision of a profiling attachment simple in construction, effective in use, comparatively inexpensive to manufacture, and which can be used in connection with any shape of bar stock and to cut any desired depth of groove and also to cut various shapes of grooves, and which can be readily applied to an automatic screw machine and operated without any extra cost or loss of time in the production of such machine, the improvement being particularly adapted for profiling or relieving the nuts commonly used on detachable wheels for automobiles.

A further object of the invention is the provision of an improved method of relieving nuts or nut blanks.

Heretofore there has been no provision for locking the nut after it has been screwed up tight, and wheel companies have been trying to develop a suitable lock for holding the nut securely in place after it has been forced home and have been attempting to form a groove in the tapered portion of the nut by means of a punch-press operation—all of these experiments having been conducted at considerable expense with unsatisfactory results.

In attempting to form a groove in the tapered portion of the nut by a punch-press, not only is the formation of the groove unsatisfactory, but it is necessary to recounterbore the nut in order to have a round bore on the inside of the tapered portion of the nut; whereas by means of the present improvement, not only is a satisfactory groove provided in the tapered portion of the nut, but there is no necessity of reboring the nut since the formation of the groove does not in any way interfere with the bore of the nut. Therefore, the primary object of the present invention is the provision of an attachment simple and efficient in use and which will effectively relieve or groove the tapered face of a nut in an expeditious and satisfactory manner, thereby providing the nut with means for locking it in place when screwed home and which operation can be performed on an automatic screw machine simultaneously with numerous other operations performed by such a machine without loss of time or any appreciable extra cost.

In the drawings accompanying and forming a part of this specification—

Figure 1 is a plan view of this profiling attachment;

Fig. 2 is a side view thereof, with the forming slide to which it is attached shown in section;

Fig. 3 is a rear end view of Fig. 1;

Fig. 4 is a cross-sectional view taken on line 4—4, Fig. 1;

Figs. 5, 6 and 7 illustrate a nut having one form of groove therein;

Figs. 8, 9 and 10 illustrate a nut having a different form of groove therein;

Figs. 11, 12 and 13 illustrate a nut having a still different form of groove therein; and Figs. 14 and 15 are views illustrating the cutter which may be used with this profiling attachment.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

When this profiling attachment is used in connection with an automatic screw machine, one of the rotary work spindles 2 carries the work or nut 3 to be profiled or relieved, and as this spindle is a rotatable spindle, it will be understood that the work is rotated relatively to the cutter or tool used in connection therewith. The side or forming slide 4 of such a machine, which, as is well known, is located transversely to the work spindles and is reciprocated toward and from the same in the usual manner, has secured thereto a base or block 5, this being bolted to the forming slide 4 in such manner that it may be adjusted transversely relatively to the slide and for which purpose the forming slide is provided with T-shaped slots 6 for the reception of nuts 7 receiving the bolts 8 for securing the base 5 to the forming slide 4. It will be understood, of course, that the forming slide carries the necessary forming tools for working on the side of the work.

Carried by the base 5 is an independent or supplemental slide 9 which is dovetailed into the base 5 so as to reciprocate relatively to the base 5 and thus be shiftable toward and from the work. This supplemental slide 9 has a sliding fit in the base 5 and is held in place by a gib 10 and screws 11 and is provided on its front end with an angular dovetailed face 12 for the reception of the cutting tool 13 which is provided with a dovetailed portion 14 fitting the dovetailed face or way of the supplemental slide, this cutting tool being secured in place by means of binding screws 15.

Carried by the supplemental slide is a roller 16—although a shoe may be used in place thereof, if preferred. This roller is in position to contact with the work 3 (see Fig. 1) and rides on the surface thereof. The roller rotates on a stud 17 secured to a bracket 18 by means of a nut 19, and this bracket in turn is secured to the supplemental slide by a bolt 20 so that the roller 16 moves back and forth with the supplemental slide 9. A stop-plate 21 is securely bolted to the rear end of the base 5, and loosely mounted therein is a screw 22 threaded into the supplemental slide 9, and on this screw between two washer-seats 23 a spring 24 is located effective to exert forward pressure on the supplemental slide 9, which slide is kept from being pushed out of its base by the screw 22 and the nut 24' carried thereby in engagement with the stop-plate 21.

To regulate the proper depth of the relieved portion or groove to be cut in the side face or profile of the work or nut, a stop-screw 25 is secured to the reciprocating unit by means of a post 26, and this screw is in position to contact against a fixed stop 27 carried by the machine and thus limit the depth of cut and insure a uniform depth thereof at all times. When machine is not provided with such stops the stop screws 22 may be used for the same purpose.

In the operation of this machine, when the forming slide 4 advances toward the work, the profiling attachment also advances therewith by reason of the stop-plate 21 and spring 24, so that the roller 16 comes into contact with the side face of the work (see Fig. 1) and rides on the surface thereof, thus causing the supplemental slide to move back against the spring according to the shape or angularity of the work. In other words, when the roller 16 engages the flat face of the nut, the cutting tool will groove or relieve the tapered portion of the nut in the manner shown, and when the nut is rotated to bring the corner thereof in contact with the roller 16, it forces the roller and thereby the supplemental slide rearward against its spring 24 and thus causes the cutter to clear the work, the cutter returning to the next flat face of the work as soon as the corner of the nut is rotated away from the roller.

Any shape of bar stock may be used in connection with this profiling attachment, the number of reliefs being governed by the number of sides on the bar stock and the depth of the relief can be slight or great according to the requirement. However, when used with round stock, only one relief can be made and in this case the collet in the work spindle must be eccentrically located. However, as nuts are usually formed of angular stock, it will be observed that as many reliefs or grooves can be obtained as there are flat sides to the stock bar or nut, and that the relief or groove can be a radius or curve (as shown in Figs. 5, 6 and 7), or have a relatively sharp formation (as shown in Figs. 8, 9 and 10), or have the shape shown in Figs. 11, 12 and 13, or any other desired shape; and, as stated, can be used with any shape of bar stock in connection with a nut or other forms of work.

Thus it will be observed that I have provided a profiling attachment of simple and efficient construction readily adapted for attachment to a reciprocating slide such as a forming slide of a metal working machine in which the cutter or tool carried by the profiling slide is reciprocated by means co-operating with the slide and with the work. In other words, the spring 24 shifts the slide forward, while the roller 16 in engagement with the work operates to shift the slide backward, whereby the slide is reciprocated toward and from the work efficiently, the rotation of the work shifting the slide according to the angularity of the work when the stock bar is of angular formation and according to the eccentricity of the work spindle collet when the stock bar is of circular form.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. A profiling attachment comprising in combination with a reciprocating slide and a rotatable work spindle supported transversely thereof, a supplemental slide mounted on the slide, a tool carried thereby in position to engage the side of the work, and means for reciprocating the supplemental slide a plurality of times corresponding to the number of faces of the work to be relieved during each rotation of the work and including means in engagement with the work and effective during the rotation of the work to retract the tool therefrom and engaging the work at the same side as the tool.

2. A profiling attachment comprising in combination with a reciprocating slide and a rotatable work spindle supported transversely thereof and adapted to carry a bar of stock for the formation of nuts therefrom, a supplemental slide mounted on the slide, a tool carried thereby in position to engage the side of the nut and relieve the same, means for pressing the supplemental slide forward into engagement with the nut, and means located to engage the nut at the same side as the tool for forcing the slide rearwardly relatively to the nut according to the varying shape of the nut.

3. A profiling attachment comprising in combination with a reciprocating slide and a rotatable work spindle supported transversely thereof, a supplemental slide mounted on the slide, a tool carried thereby in position to engage the side of the work, means for pressing the supplemental slide forward into engagement with the work, and means in engagement with the outer periphery of the work for forcing the slide rearwardly relatively to the work and engaging the work at the same side as the tool.

4. In a machine having a rotatable work spindle carrying the work, a forming slide mounted transversely relatively to the work, a supplemental slide carried thereby and adapted to carry a tool, and co-operating means in engagement with the supplemental slide and with the work at the same side as the tool for reciprocating said slide according to the shape of the work and effective to retract the tool during the rotation of a high spot on the work.

5. In a machine having a rotatable work spindle carrying the work, a forming slide mounted transversely relatively to the work, a supplemental slide carried thereby and adapted to carry a tool, and co-operating means in engagement with the supplemental slide and with the work at the same side as the tool for reciprocating said slide according to the shape of the work and comprising a spring and a work-controlled member the latter operative to retract the slide from the work during the rotation of a high spot on the work.

6. In a machine having a rotatable work spindle carrying the work, a forming slide mounted transversely relatively to the work, a supplemental slide carried thereby and adapted to carry a tool, and co-operating means in engagement with the supplemental slide and with the work at the same side as the tool for reciprocating said slide according to the shape of the work and comprising a spring and a work-controlled member, the former in engagement with the supplemental slide and the latter with the work and effective to retract the slide from the work during the rotation of a high spot on the work.

7. In a machine having a rotatable work spindle carrying the work, a forming slide mounted transversely relatively to the work, a supplemental slide carried thereby and adapted to carry a tool, and co-operating means in engagement with the supplemental slide and with the work at the same side as the tool for reciprocating said slide according to the shape of the work and comprising a spring and a work-controlled member, the former in engagement with the supplemental slide and the latter comprising a roller in engagement with the work for retracting the tool.

8. In a machine having a rotatable work spindle carrying the work, a forming slide mounted transversely relatively to the work, a supplemental slide carried thereby and adapted to carry a tool, co-operating means in engagement with the supplemental slide and with the work at the same side as the tool for reciprocating said slide according to the shape of the work and comprising a spring and a work-controlled member, the former in engagement with the supplemental slide and the latter comprising a roller in engagement with the work for retracting the tool and means for regulating the depth of the cut.

9. A profiling attachment comprising in combination with a reciprocating slide and a rotatable work spindle supported transversely thereof, a supplemental slide mounted on the slide, a tool carried thereby in position to engage the side of the work, means engaging the work at the same side as the tool for reciprocating the supplemental slide a plurality of times corresponding to the number of faces of the work to be relieved during each rotation of the work and effective to retract the slide during the rotation of high spots in the work and adjustable means for regulating the depth of the cut.

10. A profiling attachment comprising in combination with a rotary work spindle, a slide, a cutter carried thereby, means for causing the slide to engage the work, and means engaging the work at the same side as the cutter and operative according to the angularity or shape of the work to reciprocate said slide and effective to retract the slide during the rotation of high spots in the work.

11. A profiling attachment comprising in combination with a main slide and a rotatable work spindle supported transversely thereof, an adjustable supplemental slide mounted on the main slide, a tool carried thereby in position to engage the side of the work, means for pressing the supplemental slide forward into engagement with the work, and means located parallel to the tool and in engagement with an unfluted part of the work for forcing the slide rearwardly a plurality of times relatively to the work according to the shape thereof during each complete rotation of the work.

12. The combination with a rotary nut blank supporting means, of an attachment for profiling such nut blanks and comprising means for supporting a nut profiling tool, and means for reciprocating said nut profiling tool toward and from the blank and including rotatable means operative on the rotation of the blank to carry the tool away from the blank, the tool and the rotatable means operating at the same side of the blank.

13. The method of profiling the tapered front faces of nuts which consists in rotating a nut blank and reciprocating a profiling tool into engagement with the tapered front faces of the blank thereby to relieve the same, the tool being retracted from the blank at intervals during the rotation thereof.

14. The method of relieving nut blanks which consists in rotating a nut blank and reciprocating a tool into engagement with the blank, the tool being retracted from the blank when the high spots of the blank reach a predetermined position.

15. The method of relieving angularly formed nut blanks which consists in rotating a nut blank and reciprocating a tool into engagement with the blank, the tool being retracted from the blank by the angular corners of the blank.

16. The method of relieving angularly formed nut blanks which consists in rotating a nut blank and reciprocating a tool into engagement with the blank, the tool being retracted from the blank by the angular corners of the blank and having engagement with the blank alternately with the retraction thereof by the angular corners of the blank.

Signed at Cleveland, in the county of Cuyahoga and State of Ohio, this 28th day of August, 1929.

ALFRED E. DRISSNER.